July 13, 1965     W. R. DORSEY ETAL     3,194,670
METHOD OF DEHYDRATING FOOD
Filed Sept. 21, 1962
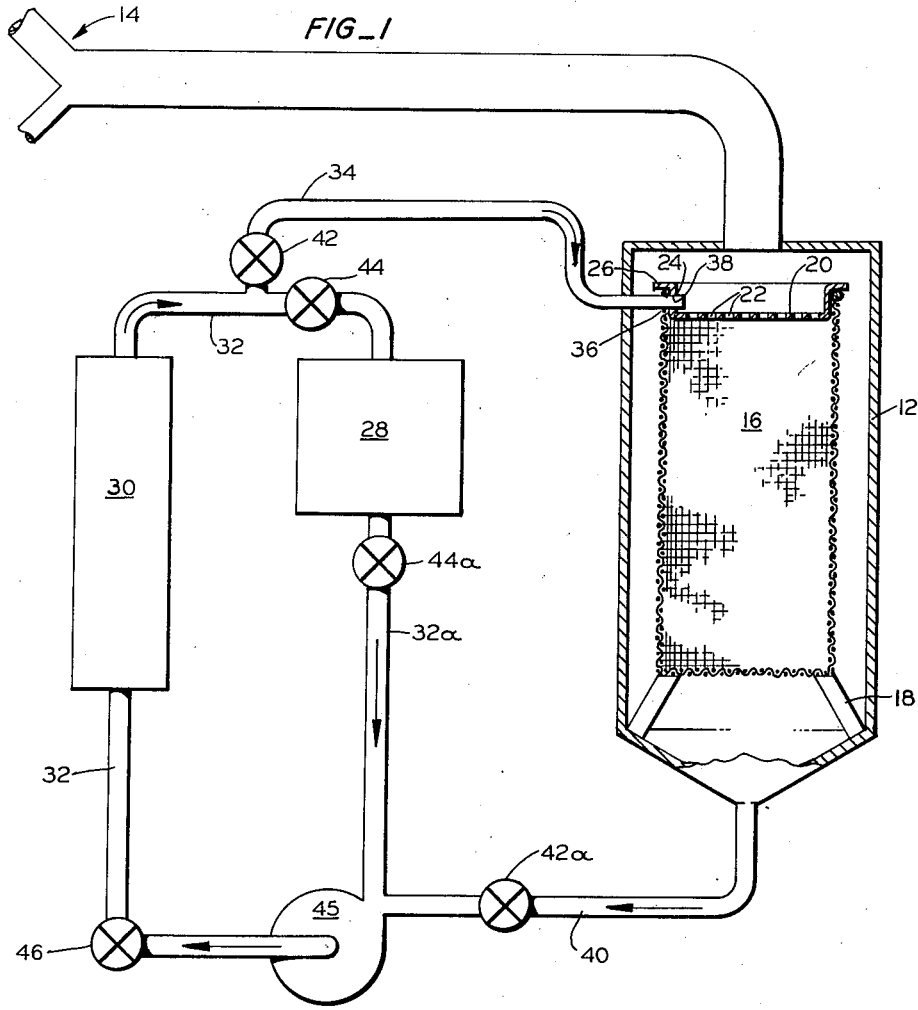
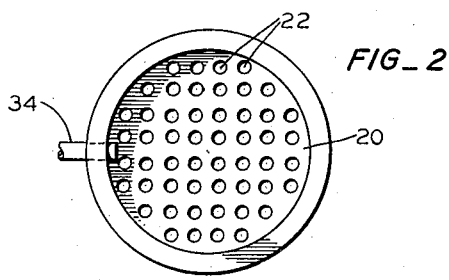
INVENTOR.
WILLIAM R. DORSEY
SUMNER I. STRASHUN
ROBERT L. ROBERTS
BY *Caul Hobbs*
ATTORNEY

United States Patent Office 3,194,670
Patented July 13, 1965

3,194,670
METHOD OF DEHYDRATING FOOD
William R. Dorsey and Robert L. Roberts, Orinda, and Sumner I. Strashun, El Cerrito, Calif., assignors to Vacu-Dry Company, Oakland, Calif., a corporation of California
Filed Sept. 21, 1962, Ser. No. 225,428
3 Claims. (Cl. 99—199)

This is a continuation-in-part of application Serial No. 9,617, filed February 18, 1960, now abandoned by applicants.

This invention relates generally to food dehydration and more particularly relates to methods and means for dehydrating foods with liquid heat transfer media.

According to the known art, exemplified by U.S. Letters Patent No. 2,473,184 issued to W. A. Webb on June 14, 1949, food is dehydrated in this manner by immersing it in a bath of circulating heated oil for a predetermined period, which bath is located in a subatmospheric environment. The subatmospheric environment sufficiently reduces the boiling point of moisture contained in the food for the oil to evaporate and drive it off at a temperature below which the food is cooked or otherwise altered. Immersion of the food in the oil bath, however, presents certain problems. In the first place, only that portion of food located at the top of the bath is in contact with the subatmospheric environment, whereas underlying food in the bath is subjected to progressively increased pressure as a result of the surrounding and overlying bath whereby food located adjacent the bottom of the bath does not fully benefit from the subatmospheric environment.

In accordance with the present invention, food to be dried is contacted with heated but dispersed edible oil in a subatmospheric environment, whereby outer surfaces of all the food are simultaneously subjected to the drying media and the subatmospheric moisture receiving environment.

It is the object of the present invention to provide an efficient method and apparatus for dehydrating foods in a minimum period of time.

An additional object and feature resides in terminal maximum evacuation of the drying chamber to render the heated oil from the food leaving only an insignificant and nondeleterious oil residue on the food.

The invention combines simplicity and facility in an apparatus and method providing efficiency and economy in operation.

The foregoing and other objects will be appreciated upon reading the following description and understanding the accompanying drawings illustrating schematically a preferred embodiment of the present invention.

In the drawings:

FIG. 1 schematically illustrates an apparatus illustrative of the present invention; and FIG. 2 is a plan view of the perforate top for a foraminous container as illustrated in FIG. 1.

The drawings illustrate a chamber 12 which is hermetically sealed to permit evacuation through vacuum control 14 effecting a subatmospheric environment within chamber 12. A foraminous basket 16 is positioned within chamber 12 and means not illustrated such as a door is provided for insertion and removal of the basket. Legs 18 support the basket and a top 20 formed with perforations 22 and raised marginal edges 24 terminating in a shoulder 26 is removably received at the top of basket 16.

A circulatory and heating means for the oil used in the process appear to the left of chamber 12 in FIG. 1. An oil reservoir 28 communicates with heat exchanger 30 through suitable lines 32 and 32a as indicated by the arrows, and oil heated in exchanger 30 is communicated to chamber 12 through intake line 34 which latter line terminates in a position to protrude through registering apertures 36 and 38 respectively in basket 16 and top 20 whereby incoming heated oil is deposited in the apertured top. Exhaust line 40 communicating with the bottom of chamber 12 exhausts oil from the bottom of the chamber and means such as a centrifugal pump 45 is positioned to operate the system.

Valves 42–42a are operable to close chamber 12 from heat exchanger 30, communicating reservoir 28 exclusively therewith, whereas valves 44–44a are operable to reverse the communication excluding reservoir 28 from the exchanger and circulating heated oil through chamber 12. An additional valve 46 cuts off heat exchanger 30.

In use, foods to be dehydrated are placed within foraminous basket 16, top 20 is placed on the basket with apertures 36 and 38 registering and the basket in turn is inserted into chamber 12 and positioned with intake pipe 34 passing through the registering apertures as illustrated in FIG. 1. In the meantime valves 42–42a have been closed, valves 44–44a opened and pump 45 actuated to circulate oil contained in reservoir 28 through heat exchanger 30. Having closed the door or other unillustrated means to seal chamber 12, the chamber is evacuated to a subatmospheric state by actuation of control 14, valves 42–44a are opened and valve 44 closed to communicate the heated oil with chamber 12. The heated oil entering through intake line 34 is deposited on apertured pan or top 20. Apertures 22 in combination with gravity disperse the oil to fall in a shower of dispersed oil upon the underlying food. The heated oil in conjunction with the reduced boiling point of moisture contained within the food causes the moisture to evaporate into the subatmospheric environment and bubbling is effected within the chamber which may be observed through suitable means such as a transparent window. Oil falling to the bottom of chamber 12 is exhausted through exhaust line 40 to be recirculated through heat exchanger 30 and the process is continued until bubble formation subsides the food is substantially dehydrated.

At this point valve 42 is closed and continued operation of pump 45 exhausts oil remaining in chamber 12, having initially opened valve 44 and closed 44a to return the oil to reservoir 28. Valve 42a is then closed and vacuum control 14 is actuated to further reduce the vacuum within chamber 12 to exhaust as much residual oil remaining on the food as possible.

Efficient dehydration of most foods is accomplished with an initial vacuum in chamber 12 within the pressure range of 1 to 4 inches of mercury absolute. This vacuum reduces the boiling point of moisture contained in the food so that dispersed and heated oil or other liquid heat transfer media within the range of 100–200° F. can efficiently dehydrate the foodstuffs without cooking and without requiring an excessive vacuum. Some foods, for instance meats and sea foods, require lower drying temperatures and corresponding lower pressures to prevent denaturization. After the food is dried to the desired moisture level, the vacuum within chamber 12 is reduced to a terminal vacuum of about 1 mm. of mercury absolute to help remove the heating oil from the food surfaces.

The following specific examples are illustrative of the described process applied to a variety of foods:

*Example 1*

⅜″ thick slices of Pippin apples dehydrate from an initial moisture content of about 85% down to a finish moisture content of .5% (by weight) by approximately 10 minutes' exposure to dispersed coconut oil at 200° F. with a pressure of 1″ of mercury absolute in the vacuum vessel.

*Example 2*

1″ cross-cut frozen green beans (Tendergreen variety) dehydrate from an initial moisture content of approximately 90% down to a finish moisture of 2% in about 40 minutes, employing coconut oil as the heat transfer medium at 155–175° F. and employing a pressure of 1–3 inches of mercury in the vacuum vessel.

*Example 3*

Employing hydrogenated vegetable oil at a temperature within the range of 165–180° F., fresh shrimp dry from an initial moisture content of 65% down to a finish moisture of 2.8% in about 35 minutes with the vacuum chamber maintained at a pressure of ½″ of mercury absolute.

*Example 4*

Fresh sirloin steak dries from an initial moisture content of 65% to a finish moisture of 2% in about 2¼ hours by exposure to coconut oil within the range of 105–180° F. and to a pressure within the vacuum vessel at about 1.4–3.0 mm. of mercury absolute.

*Example 5*

Raw, deboned and sliced chicken is dried from an initial moisture content of 65% down to a finish moisture of 1.5% within one hour and 35 minutes by an applied hydrogenated vegetable oil at 160° F. The pressure within the vacuum vessel is maintained within the range of 1.2–0.6″ of mercury absolute.

A workable basket 16 has been constructed of fine mesh measuring 10 to 12 strands per inch and defining a cylinder of 1 foot long and 8 inches in diameter and closed at its bottom with mesh. A stainless steel top 20 was perforated with a plurality of apertures 22 measuring about 3/16″ diameter and spaced at approximately ½″ intervals.

The heated dispersed oil flowing over the food within basket 16 heats and evaporates moisture from contained food at the same time exposing the contained food to the surrounding subatmospheric environment, as distinguished from the know immersion process wherein only food at the top of the oil bath is exposed. This materially increases the efficiency of dehydration and provides a resultant end product of dehydrated food retaining an insignificant and nondeleterious residual oil.

Certain foods dehydrated according to the above described process do not reconstitute entirely satisfactorily in end use. This is particularly true with certain beans, meats and fish. By initially freezing these foods and then subjecting them to the above process while in a frozen state it has been found these foods dry to an exceptional end product substantially better than when treated in an unfrozen state, and also they reconstitute exceptionally well.

The method and apparatus are efficiently employed in dehydration of substantially all foods including meat, vegetables and fruits. It will be appreciated that the heated oil must be edible. By way of illustration, but not limitation, coconut oil, hydrogenated vegetable oil or peanut oil are useful. An oil with unsaturated groups may be used if nutritive requirements so dictate. Other edible liquids having vapor pressures lower than water at the described process conditions also are useful as the liquid heat transfer media as is well-known in this art.

The foregoing detailed description has been given for clearness of understanding only and no unnecessary limitations should be understood therefrom, for modifications will be apparent to those skilled in this art. The present invention is defined by the appended claims.

We claim:

1. A method of dehydrating food selected from the group consisting of meat, fish, fruit and vegetables consisting of simultaneously subjecting the food during dehydration to subatmospheric pressure and to a continuing shower of heated dispersed edible oil so as to cover the food with a continuously replenished film of hot oil that serves as a liquid heat transfer medium to supply the heat of evaporation required to dehydrate said food, the temperature of said oil falling within the range of from about 100° F. to about 200° F., said shower of dispersed edible oil being continued until the bubble formation caused by the escape of water vapor through the oil film on the food subsides.

2. A method of dehydrating food as set forth in claim 1 wherein the residue of said edible oil is substantially removed from the food after dehydration while the food is under subatmospheric pressure.

3. A method of dehydrating food as set forth in claim 1 wherein said food is first frozen before being subjected to the shower of edible oil.

References Cited by the Examiner

UNITED STATES PATENTS

| | | | |
|---|---|---|---|
| 1,574,994 | 3/26 | Moore | 34—53 |
| 1,929,691 | 10/33 | Hutteman | 99—204 X |
| 2,467,318 | 4/49 | Kellogg | 99—204 |
| 2,473,184 | 6/48 | Webb | 99—204 |
| 2,549,743 | 4/51 | Zimmermann | 99—204 |
| 2,709,857 | 6/55 | Rivoche | 34—51 |
| 2,929,150 | 3/60 | Johnston | 99—204 X |
| 2,930,139 | 3/60 | Brynko et al. | |

A. LOUIS MONACELL, *Primary Examiner.*

HYMAN LORD, *Examiner.*

UNITED STATES PATENT OFFICE
CERTIFICATE OF CORRECTION

Patent No. 3,194,670                                   July 13, 1965

William R. Dorsey et al.

It is hereby certified that error appears in the above numbered patent requiring correction and that the said Letters Patent should read as corrected below.

Column 2, line 27, for "42-44a" read -- 42-42a --; column 3, line 41, for "know" read -- known --.

Signed and sealed this 15th day of February 1966.

(SEAL)
Attest:

ERNEST W. SWIDER                               EDWARD J. BRENNER
Attesting Officer                                     Commissioner of Patents